United States Patent [19]

Papazian

[11] 4,438,182
[45] Mar. 20, 1984

[54] METHOD OF DETERMINING BATTERY LIFE

[75] Inventor: Harold A. Papazian, Littleton, Ohio

[73] Assignee: The United States of America as represented by the Secretary of the Air Force, Washington, D.C.

[21] Appl. No.: 431,496

[22] Filed: Sep. 30, 1982

[51] Int. Cl.³ .................................................. H01M 6/00
[52] U.S. Cl. ............................................. 429/91; 429/50
[58] Field of Search ......................... 429/91, 50, 90, 92, 429/93

[56] References Cited

U.S. PATENT DOCUMENTS

| | | | |
|---|---|---|---|
| 3,508,973 | 4/1970 | Hicks et al. | 136/182 |
| 4,025,700 | 5/1977 | Fagan, Jr. et al. | 429/91 |
| 4,074,025 | 2/1978 | Miyagawa | 429/91 |
| 4,179,799 | 12/1979 | Fritts | 29/623.5 |
| 4,293,622 | 10/1981 | Marincic et al. | 429/50 |

Primary Examiner—Anthony Skapars
Attorney, Agent, or Firm—Donald J. Singer; Stanton E. Collier

[57] ABSTRACT

A method of determining battery life is shown wherein a dielectric constant sensor measures the dielectric constant value of the electrolyte of the battery. The measured dielectric constant value is compared to empirical values to provide battery status. In particular, a fluid electrolyte initially composed of thionyl chloride changes during discharge or aging to an electrolyte having sulfur monochloride therein. Based upon the changes in dielectric constant between the initial fully charged state to the fully discharged state, the battery status is obtained.

4 Claims, 2 Drawing Figures

METHOD OF DETERMINING BATTERY LIFE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a method of determining the remaining life of an electrochemical cell and, more particularly, to a cell having an operating voltage which is essentially independent of the remaining life of the cell.

Electrochemical cells having the feature noted above have made the design of load circuits less complicated because of a constant output voltage, but a remaining concern is the amount of life remaining at any particular time. Some have avoided to an extent this concern by overdesigning the battery itself so that it would "certainly" last for its intended use especially if the battery is used in a one-shot condition, for example, the launching of a missile held in storage. This design may be an answer to this unique situation, but the question of remaining battery life remains unanswered. Others have designed such batteries so that an indication of pending failure is noted by an abrupt change in output voltage so that replacement occurs without interruption of service. Further, deterioration of the active materials, anode, cathode, and electrolyte, also decreases the life of a battery even before use.

A method to determine the remaining battery life is needed so that batteries are not overdesigned or specially designed thus costing much more to indicate such a condition.

SUMMARY OF THE INVENTION

In order to overcome the problems noted above, a new procedure has been developed wherein the electrochemical battery need not be overdesigned or modified for the purpose of determining battery life.

In particular, one type of electrochemical battery has an electrolyte composed substantially of thionyl chloride ($SOCl_2$). Thionyl chloride has a dielectric constant of about 9.05. During discharge of the battery sulfur monochloride ($S_2Cl_2$) is formed and is soluble in the thionyl chloride remaining. Sulfur monochloride has a dielectric constant of about 4.9. Thus as the battery discharges, the dielectric constant of the electrolyte should change from a high of about 9 to a low of about 5. Empirical measurements of the dielectric constant of the electrolyte during discharge versus discharge time produces a curve indicating life time remaining for a particular dielectric constant. While the battery is inoperative, the dielectric constant also changes because of deterioration in the electrolyte thus a dielectric constant versus time curve can also be used during this time to determine remaining life.

An external sensor measures the dielectric constant, compares it with the empirical results and outputs a value indicating the percentage of remaining life.

Therefore, it is one object of this invention to provide for a method of measuring remaining battery life.

It is another object of this invention to provide for a method of measuring battery life as determined from a dielectric constant versus time curve of an electrochemical battery having thionyl chloride as an electrolyte and sulfur monochloride as the end product.

These and other objects and advantages of the present invention will be readily apparent to one skilled in the pertinent art from the following detailed description of a preferred embodiment of the invention and claims when considered in light of the drawings.

DETAILED DESCRIPTION OF THE PREFERRED EMBODIMENT

Figure 1:
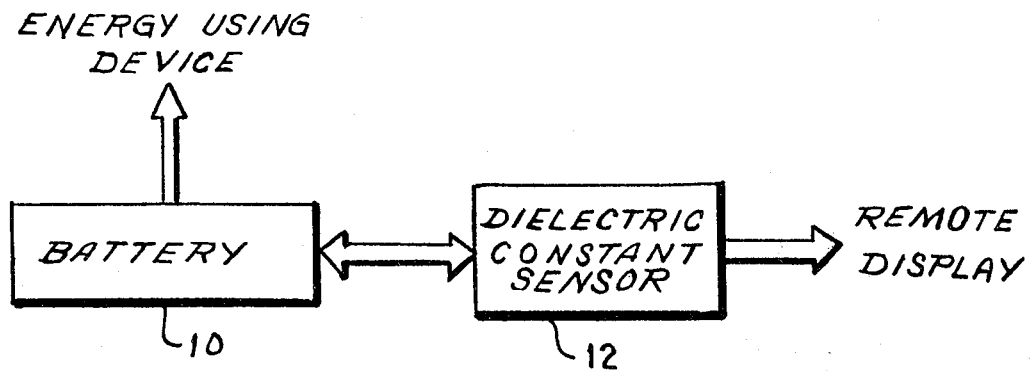
FIG. 1 is a functional block diagram of the apparatus used in implementing the method of this invention.

The present invention employs an external method to determine battery life. Referring to FIG. 1, an electrochemical battery 10 is used to supply electrical power to devices (not shown). A dielectric constant sensor 12 is operably connected to battery 10 for measuring the change in dielectric constant of the fluid therein. The fluid therein comprises initially pure electrolyte and as the battery supplies electrical power or ages in an inoperative state discharge products are added to the electrolyte changing the overall electrical properties of the fluid. Sensor 12 provides signals to a remote display (not shown) for indicating remaining life, for example. Although the electrolyte of this invention is preferably fluid, the principle of measuring changing dielectric constant is also applicable to paste-like compositions or other conventional electrolyte materials.

For example, a lithium thionyl electrochemical battery has an overall chemical reaction as shown in the following equation:

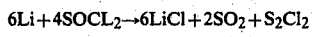

$$6Li + 4SOCL_2 \rightarrow 6LiCl + 2SO_2 + S_2Cl_2$$

Figure 2:
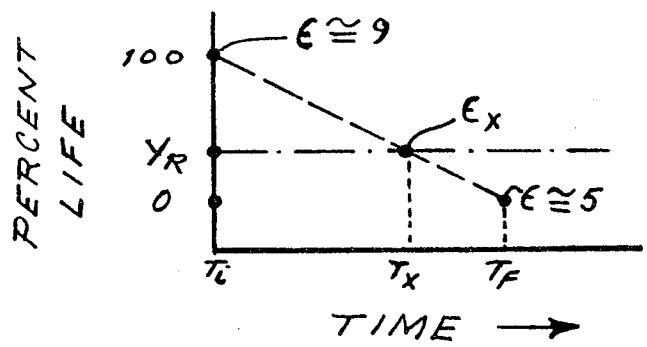
FIG. 2 is an illustrative graph of dielectric constant versus time used in determining remaining life of an electrochemical battery by the method of this invention.

Thionyl chloride ($SOCl_2$) has a known dielectric constant of 9.05 and sulphur monochloride ($S_2Cl_2$) has a dielectric constant of 4.9. As seen in the equation, battery 10 starts out with an electrolyte of thionyl chloride and at the end of battery's 10 life has mostly sulfur monochloride in solution with other discharge products; thus, by measuring empirically the change in dielectric constant of battery 10, one is able to determine the remaining battery life by comparing a measured dielectric constant to a curve of dielectric constant versus time as shown in FIG. 2. At the initial time, $T_i$, there is 100 percent of the battery life remaining when the dielectric constant $\epsilon \approx 9$; when battery 10 is fully discharged, zero percent of life, $\epsilon \approx 5$. By having a measured dielectric constant of $\epsilon_x$ at time $T_x$, the percent of remaining life is $Y_R$ and the time left before full discharged is $T_f - T_x$. For purposes of maintenance and system reliability, one certainly would not drive battery 10 into a fully discharged state, but would set a level such as 25% remaining life at which time battery 10 would be replaced.

Dielectric constant sensor 12 would measure the dielectric constant of the fluid using suitable circuits that measure the permittivity or impedance of the material between the anode and cathode of battery 10. The measured dielectric constant, being of an analog nature, would be converted to a digital value by conventional analog-to-digital circuits (not shown) and input to a conventional microprocessor (not shown) or other programmable device so that the digital value is compared in a lookup table to empirical values obtained previously. The microprocessor of sensor 12 can output a warning signal indicative of battery replacement, percent of battery life remaining, or actual life remaining to the remote display.

The graph shown in FIG. 2 is only illustrative of a relation between dielectric constant and time. Because of the unique design of battery 10, an empirical curve must be obtained before actual use of this method.

In operation, the empirical curve obtained from a particular battery 10 is placed into a lookup table in the microprocessor so that a given value of $\epsilon$ provides a time remaining and a percent of life remaining. Further, a replacement $\epsilon$ value is also placed in the microprocessor. As battery 10 discharges, sensor 12 measures the dielectric constant of the fluid therein and compares this value to values in a lookup table. Sensor 12 outputs appropriate signals to a remote display indicative of the state of battery 10.

Clearly, many modifications and variations of the present invention are possible in light of the above teachings and it is therefore understood that, within the scope of the inventive concept, the invention may be practiced otherwise than specifically describe.

What is claimed is:

1. A method of determining the status of a battery comprising the steps of:
   measuring a dielectric constant of an electrolyte of the battery;
   comparing the dielectric constant obtained during said measuring to predetermined values, the predetermined values indicating battery status at the measured dielectric constant; and
   outputting the status of the battery based upon said step of comparing the measured dielectric constant to said predetermined values.

2. A method of determining the status of a battery as defined in claim 1 wherein said electrolyte is a fluid.

3. A method of determining the status of a battery as defined in claim 3 wherein said fluid is initially composed of thionyl chloride.

4. A method of determining the status of a battery as defined in claim 1 wherein said step of measuring occurs when said battery is not discharging.

* * * * *